DIGITAL COMPUTER SYSTEM

Original Filed Feb. 15, 1961 6 Sheets-Sheet 1

JACK C. SMELTZER
INVENTOR.

BY John L. Jackson
ATTORNEY

Oct. 10, 1967 J. C. SMELTZER 3,346,852

DIGITAL COMPUTER SYSTEM

Original Filed Feb. 15, 1961 6 Sheets-Sheet 2

JACK C. SMELTZER
INVENTOR.

BY John L. Jackson

ATTORNEY

DIGITAL COMPUTER SYSTEM

Original Filed Feb. 15, 1961 6 Sheets-Sheet 3

JACK C. SMELTZER
INVENTOR.

BY John L Jackson
ATTORNEY

INVENTOR
JACK C. SMELTZER
BY Arthur Freilich
ATTORNEY

DIGITAL COMPUTER SYSTEM

Original Filed Feb. 15, 1961

INVENTOR
JACK C. SMELTZER
BY Arthur Freilich
ATTORNEY

DIGITAL COMPUTER SYSTEM

Original Filed Feb. 15, 1961

INVENTOR
JACK C. SMELTZER
BY Arthur Freilich
ATTORNEY

United States Patent Office 3,346,852
Patented Oct. 10, 1967

3,346,852
DIGITAL COMPUTER SYSTEM

Jack C. Smeltzer, Woodland Hills, Calif., assignor to The Bunker-Ramo Corporation, Canoga Park, Calif., a corporation of Delaware Continuation of application Ser. No. 89,476, Feb. 15, 1961. This application Sept. 25, 1964, Ser. No. 402,682
5 Claims. (Cl. 340—172.5)

ABSTRACT OF THE DISCLOSURE

Improvements in a serial single address digital computer enabling most operations to be executed in two word times in lieu of the four word times normally required. The increase in speed is achieved by employing a circulating register having a parallel readout capability. As a consequence, a track address flip-flop register can be set up substantially instantaneously. Thus, an instruction can be located in memory and read therefrom to set up the instruction register, the operand can be located and read from the memory and the instruction can be executed all in two word times in those instances where optimum programming has been achieved.

This application is a continuation of U.S. patent application Ser. No. 89,476 filed Feb. 15, 1961 and now abandoned.

This invention relates to electronic digital computers in general and more particularly to a system for use therein whereby most operations in a stored program single address serial digital computer can be performed in two word times.

As is well known in the computer art, a parallel machine is much faster than a serial machine. However, as is also well known, the serial machine, though slower, is much less expensive than a comparable parallel machine. Ideally then, assuming that increased speed of operation is a desirable factor, which generally it is, a digital computer should utilize techniques which allow a relatively high operational speed at a minimum cost. The present invention provides one such serial system wherein certain parallel and serial operations are combined to provide relatively high speed performance at a minimum cost, with a minimum number of components and with a minimum amount of required memory storage.

Normally a serial machine must take longer than two word times to perform an operation since it takes one word time to read in the instruction, one word time to read in the operand and, since the track flip-flops must not change during the reading process, whatever time is necessary to serially shift the track number into the track register during the setting up of both the instruction and operand tracks.

Although the time required to serially shift the track number into the track register is only *n* digit times for each track number shift where *n* is the number of bits required to define the track number, it is necessary to wait for the beginning of the word which is to be read from memory and therefore a complete word time is consumed. Thus four word times is the minimum time in which an operation can be performed in a pure serial machine.

If a circulating register which has a parallel output capability of *n* bits is utilized in a serial machine, the four word time performance can be reduced to two word times with negligible additional cost. The subject invention relates to the means by which this factor of two speed improvements can be implemented.

Briefly, the present invention provides a system for use in a single address serial computer whereby an instruction or order can be located in memory and read therefrom to set up the order register, the operand located and read from memory and the order performed all in two word times in those instances where optimum programming has been achieved.

It is an object of the present invention to provide a novel computer system which enables the performance of most instructions in two word times.

It is another object of the present invention to provide a novel technique for use in a single address digital computer which enables the performance of most operations in two word times with a minimum of equipment and at a resultant low cost.

It is another object of the present invention to provide a system which enables the performance of most operations in two word times, the system having memory storage requirements no greater than the usual type serial machine of equal capacity.

Other and further objects and advantages of the present invention will become apparent to one skilled in the art from a consideration of the following detailed description when read in light of the accompanying drawings, in which.

FIGURES 9(*a*)–9(*e*) are logical block diagrams illustrating the various system flip flops and gates utilized therewith.

Figure 1:
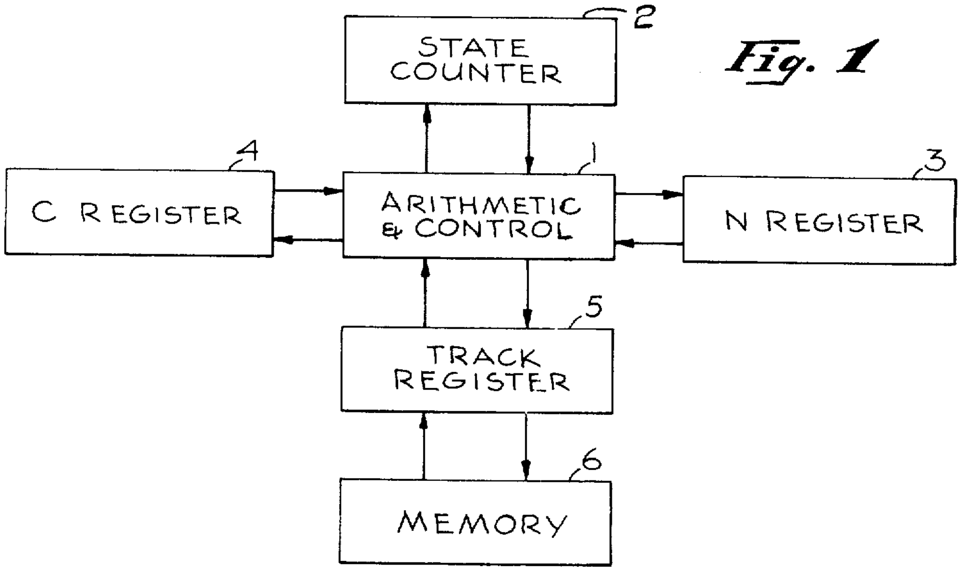
FIGURE 1 is a block diagram illustrating the computer elements used to accomplish the performance of most instructions in two word times.

Refer first to FIGURE 1. In FIGURE 1 is shown an arithmetic and control unit 1 connected to a state counter 2, an N register 3, a C register 4 and a track register 5. As is obvious from the arrows depicting information flow between the arithmetic and control unit and its various associated components, information can flow both to and from each of the associated components to the arithmetic and control unit. The track register 5 is also connected to the memory storage device 6 and controls the selection of particular tracks thereon.

All the components shown in FIGURE 1 as associated with the arithmetic and control unit 1 are under its control. For instance, as will hereinafter become obvious, the counting of the state counter 2 is controlled by an equality flip-flop FE while certain operations performed by the C and N registers are likewise controlled by the arithmetic and control unit. The track register 5 through which selection of memory tracks is made along with reading and writing into and from memory is likewise controlled by the arithmetic and control unit.

At the outset it will perhaps be helpful to clarify the terminology which will be used herein. With respect to the memory, it will be assumed for the present description that a magnetic memory drum is used. Magnetic read and write heads will be magnetically associated with the drum such that circumferential paths of information can be recorded on the drum. These circumferential paths will be referred to as "tracks." Each track will be broken down into "sectors" which will be one computer word plus a number of space digits in length.

Figure 2:
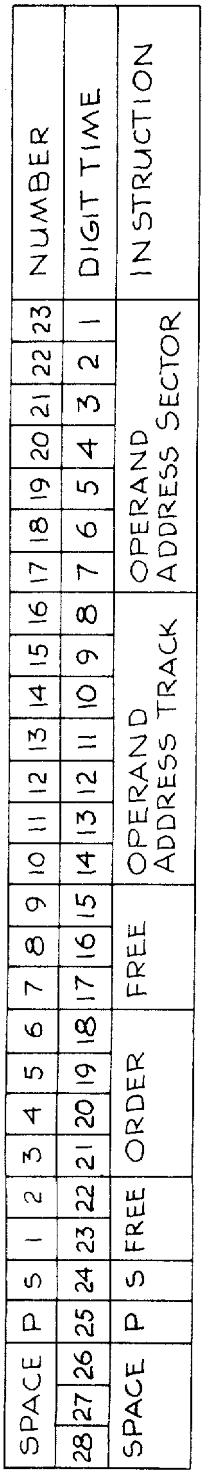
FIGURE 2 is a chart setting forth the make-up of the computer word used to facilitate the description of the subject technique.

Refer next to FIGURE 2. FIGURE 2 illustrates the make-up of the computer word which will be utilized in the description of the hereinafter described technique which enables the performance of most instructions in two word times. As is obvious from a consideration of FIGURE 2, DT's (digit times) 1 through 7 of the instruction word set forth the operand sector address. DT's 8 through 14 of the instruction word set forth the operand track address. DT's 15 through 17 are free while DT's 18 through 21 set forth the particular instruction or order to be performed. DT's 22 and 23 are free while DT 24 is the sign digit and DT 25 is the parity digit. DT's 26 through 28 are space digits. In the number word DT's 1 through 23 set forth the magnitude portion of the word while DT 24 is the sign digit and DT 25 is the parity digit. Again, DT's 26 through 28 are space digits.

Figure 3:
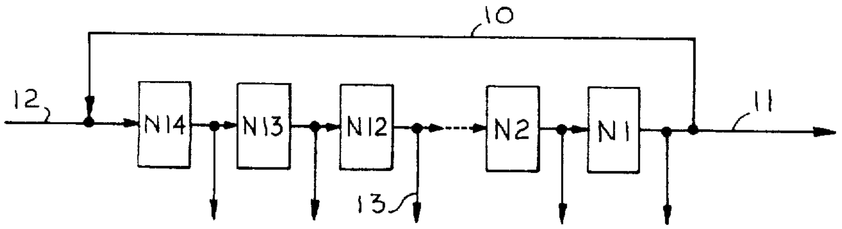
FIGURE 3 is a block diagram of circulating register, the output of which may be taken in parallel.

Two continually circulating registers will be mentioned in the description of the subject technique. These registers are the N and C registers. Both registers in the present description will be 14 digits or one-half word time in length. As is obvious, the registers need not necessarily be of this length to enable performance of the herein described technique. However, as will likewise become obvious, the registers must be a multiple or submultiple of the length of the computer word. The N register must be capable of parallel output but the C register need not have parallel output capability due to the novel method of information flow in the subject system whereby the operand address DT1–14 will be in the N register when the operand track is to be set up while the next instruction address will be in the N register when the next instruction is to be set up. In FIGURE 3 is shown a block diagram of a register which will facilitate an understanding of the N register. The serial output of the register may be taken from any stage as for instance from stage N12 along line 13. In addition, the contents of the register may be taken at any digit time in parallel from all of the stages N14 through N1 simultaneously. In the present description unless otherwise stated, the "output" of the registers will mean the serial output taken along line 11 from stage N1.

Likewise, as shown in FIGURE 3, the input to the register is along line 12 and may be from either stage N1 along line 10, as in the case of circulation, or may be from some other source in the system.

It should be obvious that while in the present description the N register is shown to have parallel output capability from all stages, it is only necessary that $n$ stages be capable of parallel output where $n$ is the number of bits required to define the track number.

Figure 4:
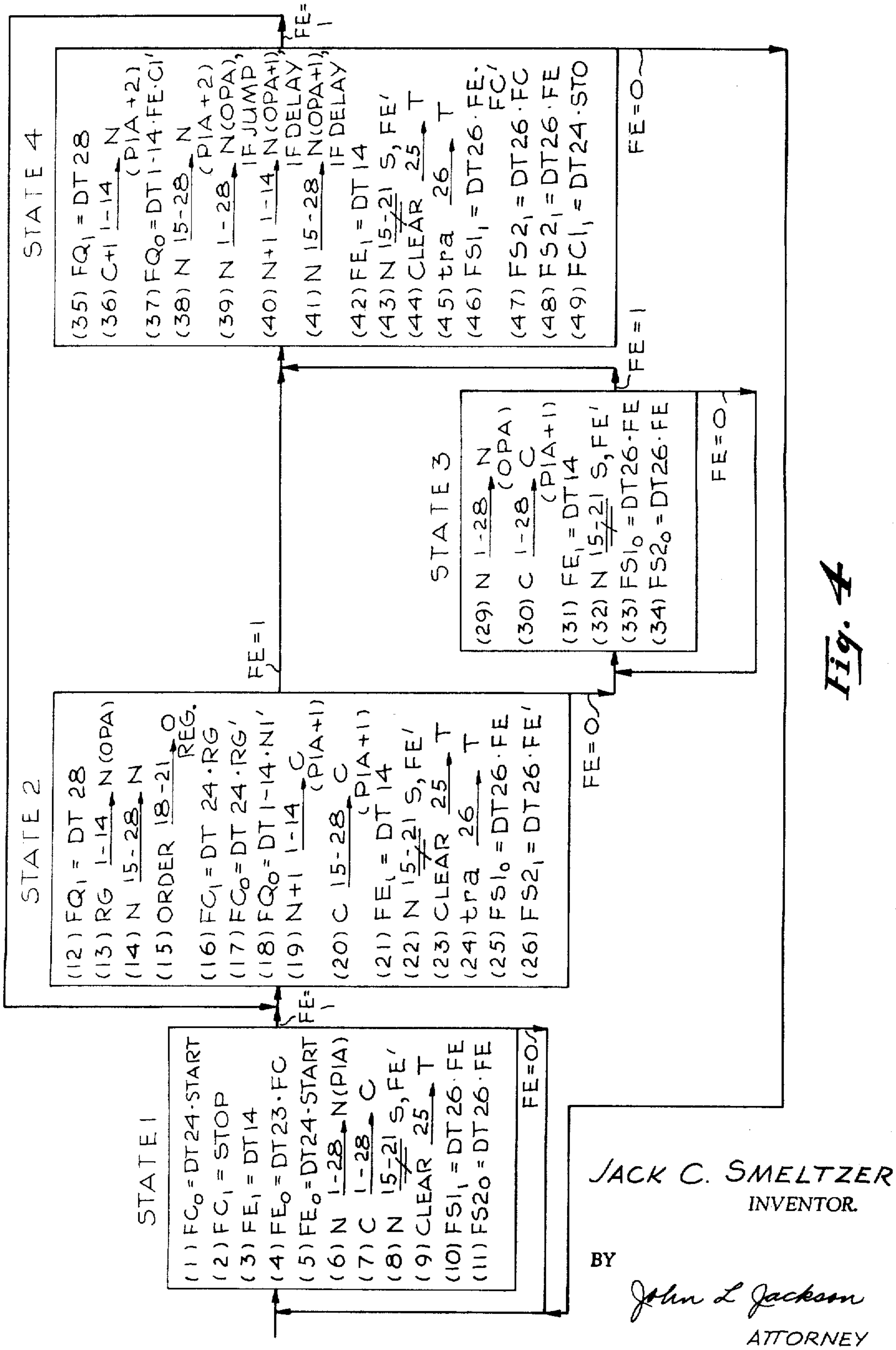
FIGURE 4 is a flow diagram which facilitates a description of the present invention.
Figure 9A:
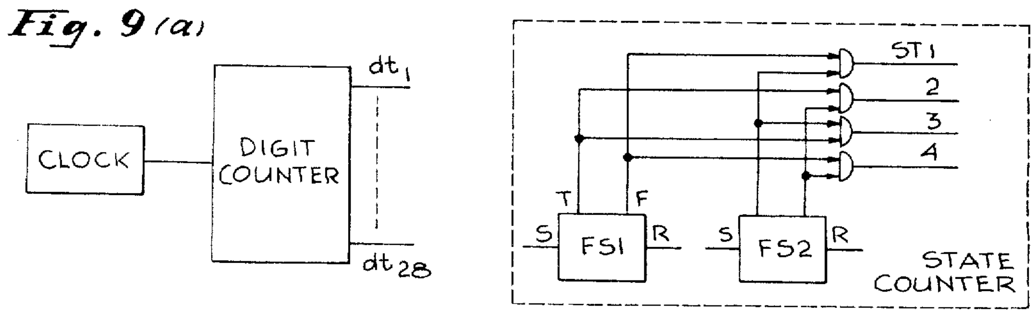
Figure 9B:
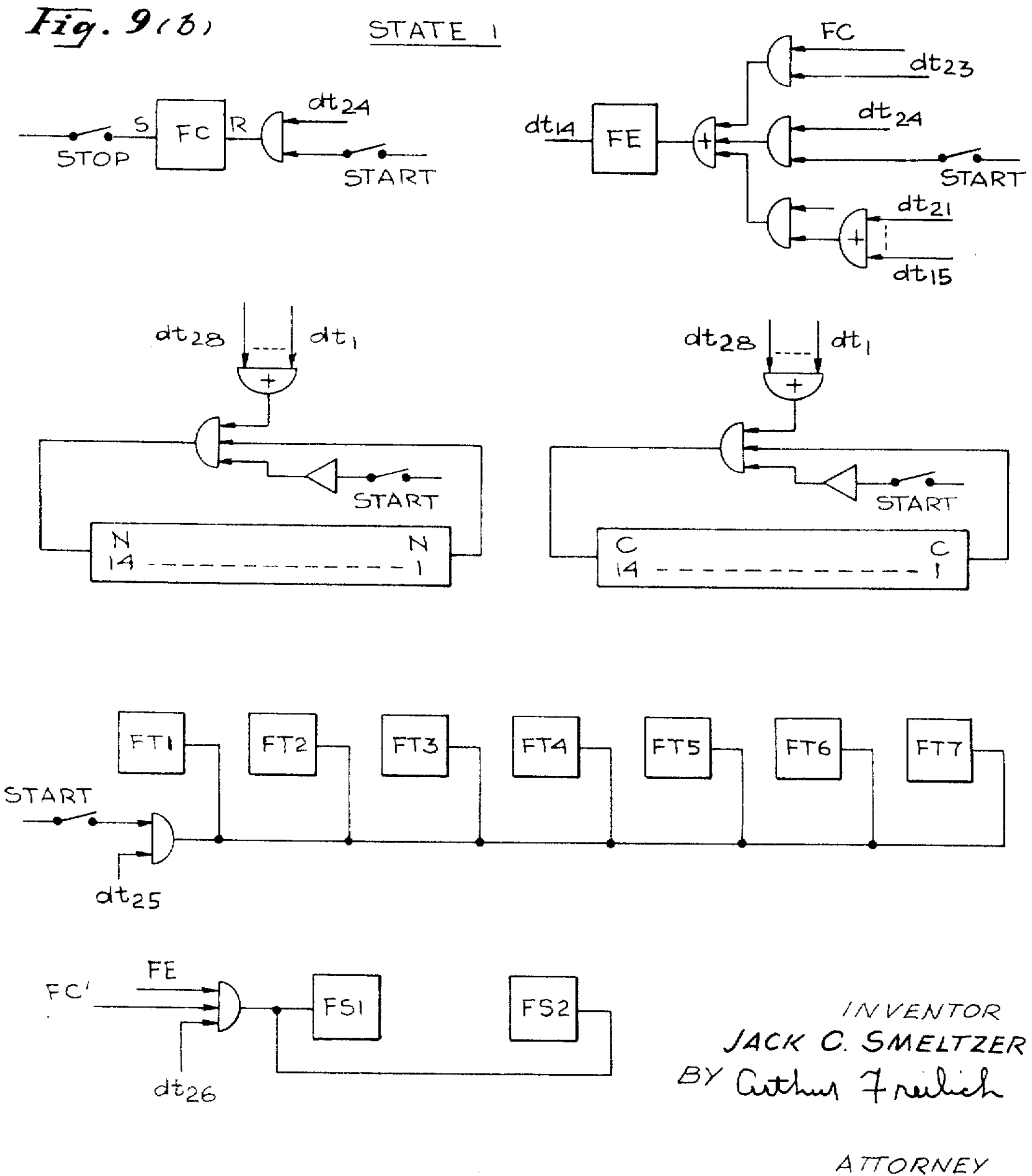
Figure 9C:
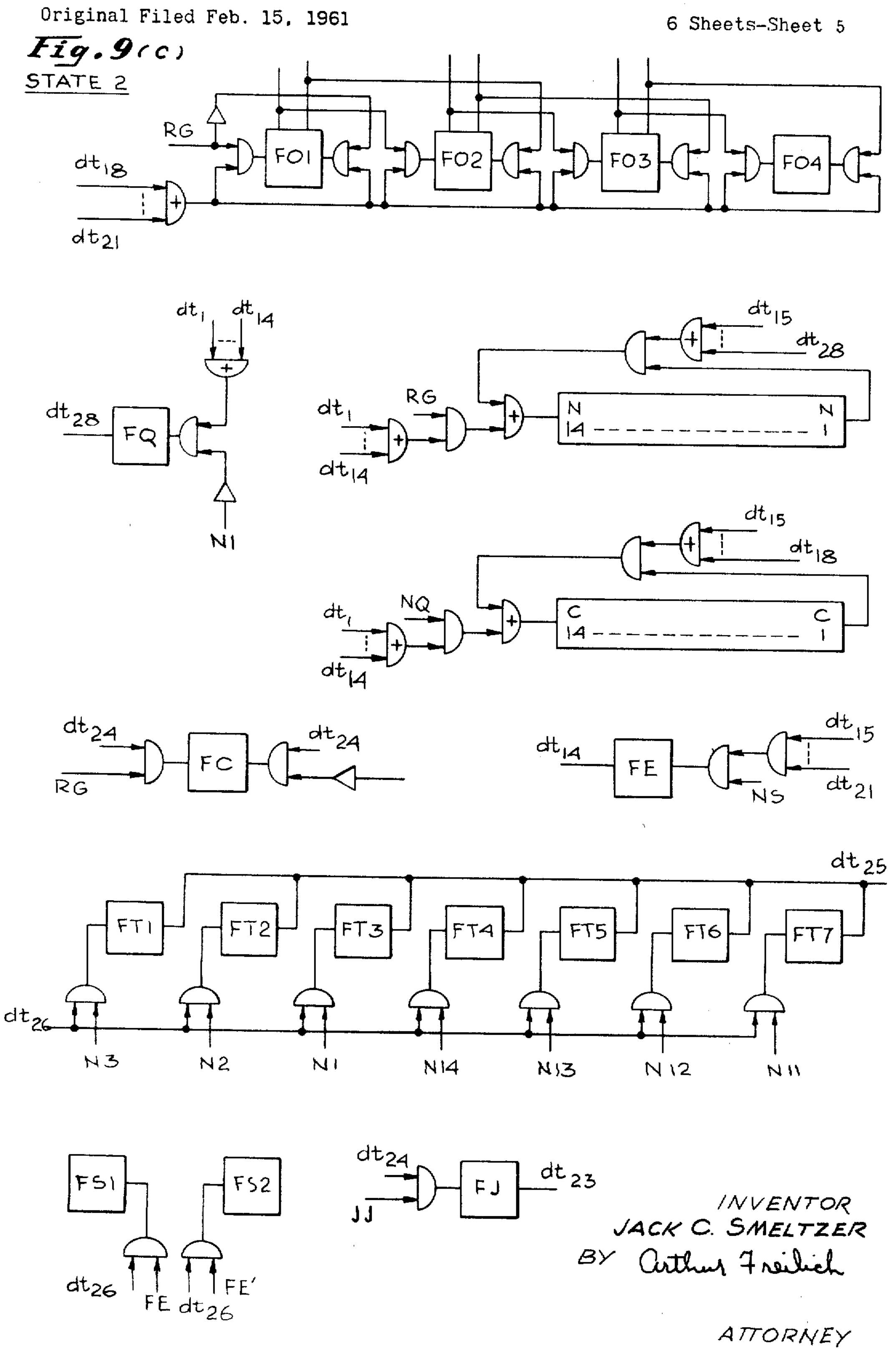
Figure 9D:
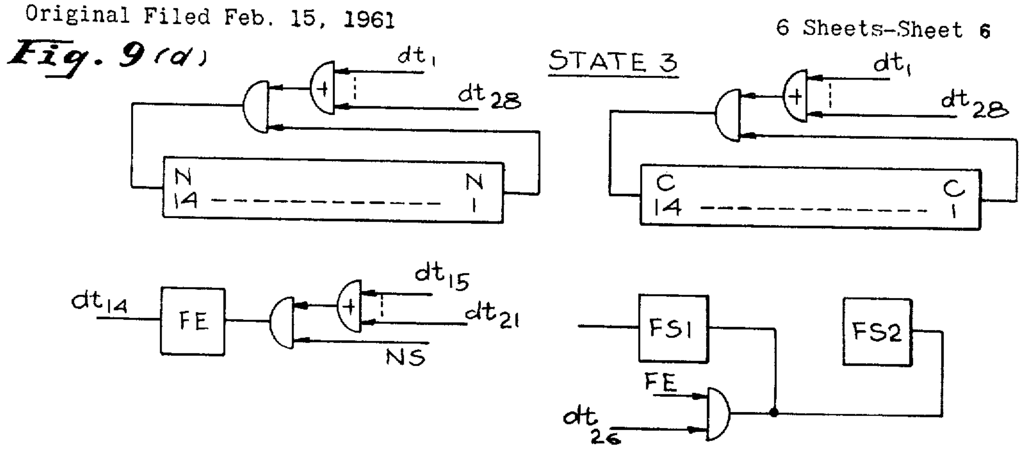
Figure 9E:
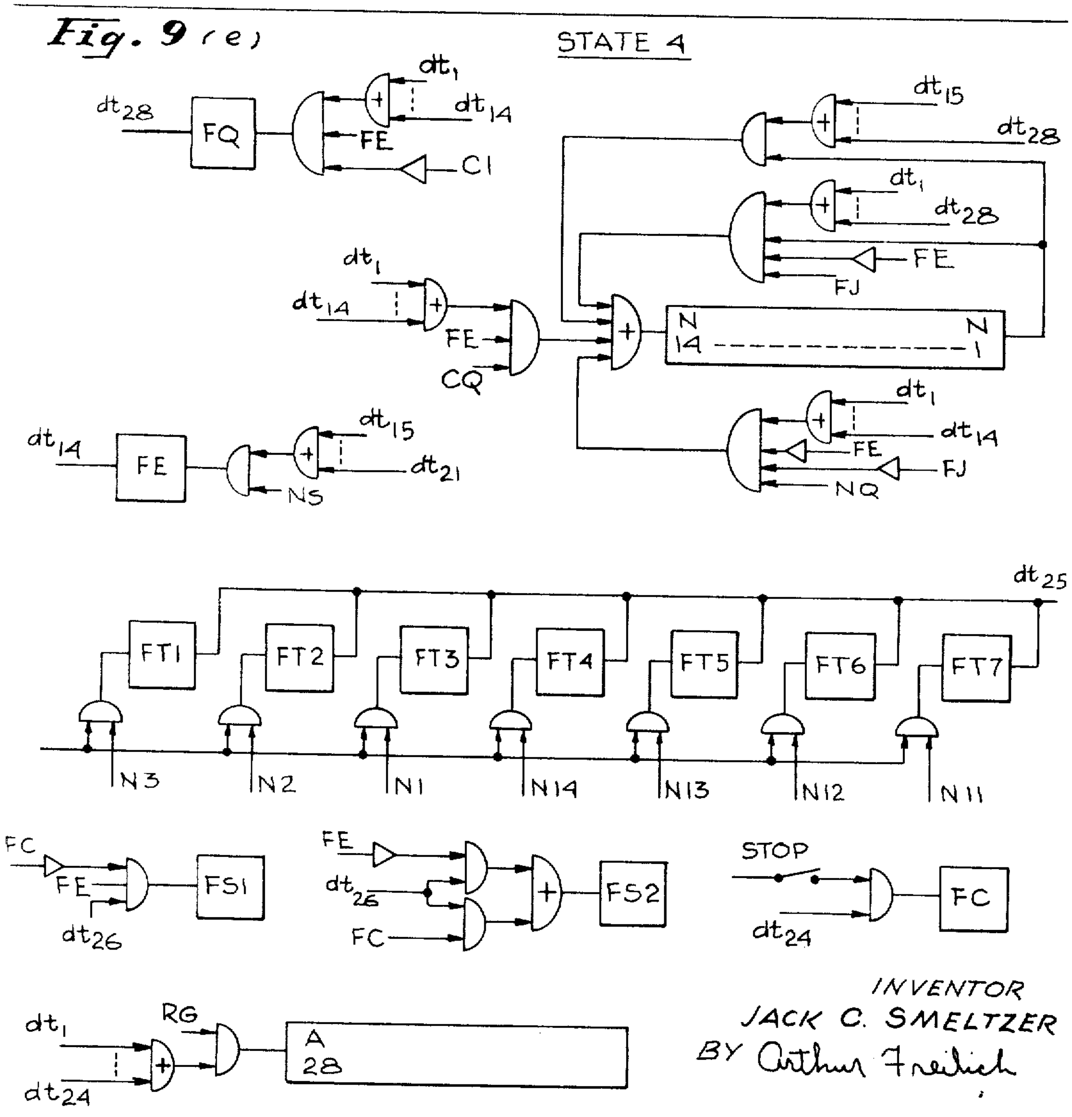

Refer next to FIGURE 4. FIGURE 4 is a flow diagram which will facilitate a description of the subject system. In FIGURE 4 four blocks are shown which each contain a symbolic description of the performance of the computer during the particular state involved. Each block represents one of the four states which the computer may operate in.

A brief word in explanation of the flow diagram, the symbolic equations and logical equations which follow, is perhaps in order. Consider, for example, the block labelled state 1. A horizontal line leaving state 1 connects state 1 to state 2 while a vertical line is showing leaving the bottom of the state 1 block and returning into the lefthand side of the block. In association with the horizontal line connecting state 1 and state 2 is the equation $FE=1$ while in association with the vertical line leaving the bottom of the state 1 block is equation $FE=0$. There is included in the arithmetic and control unit what may be referred to as an equality flip-flop, FE. The condition of FE at a particular time determines the count to be made by the state counter and hence determines which state the computer is to operate in. Thus, whenever $FE=1$ at a particular time, the computer will transfer along the horizontal line while, when $FE=0$ at the particular time, the computer will transfer along the vertical line.

A detailed description of the state by state operation of the computer will hereinafter be given and hence no detailed description of the symbolism employed need be given since it will be readily apparent.

With respect to the logical equations employed in association with the various states symbolism as follows is employed:

FE, as previously stated, is the equality flip-flop; FT1 through FT7 are the track flip-flops making up the track register; FS1 and FS2 are the state flip-flops; FO1 through FO4 are the order flip-flops; a subscript 1 indicates that if the conditions associated with the particular flip-flop involved are met, it will be set to a true or 1 state while a subscript 0 implies the converse.

The state code used in the present description is as follows:

| | FS1 | FS2 |
|---|---|---|
| ST1 | 0 | 1 |
| ST2 | 1 | 0 |
| ST3 | 1 | 1 |
| ST4 | 0 | 0 |

A preferred implementation of the state counter 2 is illustrated in FIGURE 9(*a*). FIGURE 9(*a*) also illustrates a digit counter which is responsive to a clock source, preferably a clock track recorded on the drum, and which defines digit times $dt1$–$dt24$.

RS means that the bit being read from the sector track of the memory at a particular digit time represents a one.

RG means that the bit being read from a general storage track of the memory at a particular digit time represents a one.

FJ is the jump flip-flop, FQ a miscellaneous flip-flop and FC the operation flip-flop.

STATE 1

The following logical equations describe the operation of the computer during state 1. It should be noted that all of the equations include the term "ST1" indicating that the operation described by the equation is performed only during state 1 as defined by the state counter 2. The terms "START" and "STOP," respectively, represent signals provided in response to the pressing of the start and stop buttons. The term "START" is of course the complement of "START" and means that the start button is not being pressed.

(1) $FC_0=ST1\cdot DT24\cdot START$
(2) $FC_1=ST1\cdot STOP$
(3) $FE_1=ST1\cdot DT14$
(4) $FE_0=ST1\cdot DT23\cdot FC$
(5) $FE_0=ST1\cdot DT24\cdot START$
(6) $N14=ST1\cdot DT1\text{–}28\cdot N1\cdot START$
(7) $C14=ST1\cdot DT1\text{–}28\cdot C1\cdot START$
(8) $FE_0=ST1\cdot DT15\text{–}21\cdot NS$
(9) $FT1_0=ST1\cdot DT25\cdot START$
$FT2_0=ST1\cdot DT25\cdot START$
$FT3_0=ST1\cdot DT25\cdot START$
$FT4_0=ST1\cdot DT25\cdot START$
$FT5_0=ST1\cdot DT25\cdot START$
$FT6_0=ST1\cdot DT25\cdot START$
$FT7_0=ST1\cdot DT25\cdot START$
(10) $FS1_1=ST1\cdot DT26\cdot FE\cdot FC'$
(11) $FS2_0=ST1\cdot DT26\cdot FE\cdot FC'$ Pressing of the start button will set FC false as depicted by Equation 1 while pressing the stop button will set FC true (2). FE is set true at each DT 14 (3) and FE is set false if FC is true at DT 23 (4) indicating the stop mode. Since FE is false at DT 23 if FC is true, the computer cannot exit to state 2. FE is also set false at DT 24 even though FC is not true if the start button is depressed. While the start button is depressed, the N register which is circulating is cleared by inhibiting recirculation of its previous contents. As previously stated, pressing the start button sets FC to zero (1) but the computer is prevented from exiting to state 2 while the start button is depressed by setting FE to zero at each DT 24 while the start button is depressed. When the start button is released both the N and C registers circulate (6) (7). As will hereinafter become apparent the next instruction address and the operand address (OPA) are always taken from the N register. As will also become obvious, the N register during state 1 will always contain the next instruction address. Since, in the case of start up as heretofore described the N register contains zeroes the instruction must be stored in track 00, sector 000.

Equality between the sector in memory and the next instruction address must be found. In state 1, the N register which contains the next instruction address is circulated during DT's 1 through 28 (6). The C register, which for the purposes of the following discussion will be assumed to hold nothing, is likewise circulated during DT's 1 through 28 (7). At DT 14 the state flip-flop, FE, is set true (3). The sector portion of the next instruction address which appears serially at the output portion (N1) of the N register during DT's 15 through 21 is checked with the sector being read from memory at that time to determine if equality exists, and if equality is found to exist, the equality flip-flop, FE, is left true at DT 26 while if equality does not exist, FE is false at DT 26 (8). In the start mode the track register is cleared (9) at DT 25 thus setting up track 00. In the operate mode the track register would not be cleared since the track would have been set up, as will be later explained, in state 4.

Figure 5:
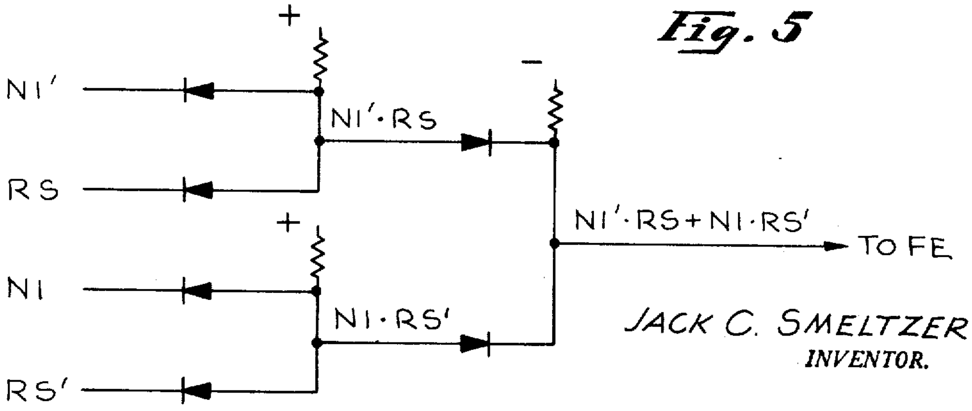
FIGURE 5 is a schematic representation of the exclusive OR gate NS.

Refer next to FIGURE 5 which is a schematic representation of an exclusive OR gate, NS which is utilized in the equality determining operation of Equation 7 and all other hereinafter mentioned equality determining operations. The logical equation describing the action of the exclusive OR gate NS is:

$$NS = N1 \times RS = N1 \cdot RS' + N1' \cdot RS$$

As is obvious from a consideration of this equation, the term NS will be true whenever, during a given digit time, the output of the N register and the output from the memory differ. Conversely NS will be false whenever, during a given digit time, the output from the N register and the memory sector are alike. Thus, the exclusive OR, NS, may be utilized to control the setting of the equality flip-flop, FE, which is always true at the beginning of the equality determining operation since it is set true at each DT 14 (6). For example, from a consideration of Equation 7, it can be seen that if at any digit time during the equality determining operation equality between N1 and RS does not exist, the gate NS will come true and FE will be set false and will remain false until it is set true at the next DT 14.

If FE is left true at DT 26, FS1 will be set true (10) and FS2 will be set false (11) and the computer will exit to state 2. If, however, FE is false at DT 26, FS1 will be left false and FS2 will be left true and the computer will remain in state 1 until equality is found to exist between the sector portion of the next instruction address and the sector being read from memory as evidenced by FE being left true at DT 26. FIGURE 9(*b*) illustrates a preferred implementation of logical Equations 1–11. For the sake of simplicity, the "ST1" term has not been specifically illustrated throughout the figure, but has been assumed to be coupled to the input of all of the gates.

STATE 2

The following logical equations describe the operation of the computer during state 2:

(12) $FQ_1 = ST2 \cdot DT28$
(13) $N14 = ST2 \cdot DT1\text{–}14 \cdot RG$
(14) $N14 = ST2 \cdot DT15\text{–}28 \cdot N1$

(15) $FO_1 = ST2 \cdot DT18\text{–}21 \cdot RG$
$FO_2 = ST2 \cdot DT18\text{–}21 \cdot FO_1$
$FO_3 = ST2 \cdot DT18\text{–}21 \cdot FO_2$
$FO_4 = ST2 \cdot DT18\text{–}21 \cdot FO_3$
(16) $FC_1 = ST2 \cdot DT24 \cdot RG$
(17) $FC_0 = ST2 \cdot DT24 \cdot RG'$
(18) $FQ_0 = ST2 \cdot DT1\text{–}14 \cdot N1'$
(19) $C14 = ST2 \cdot DT1\text{–}14 \cdot NQ$
(20) $C14 = ST2 \cdot DT15\text{–}28 \cdot C1$
(21) $FE_1 = ST2 \cdot DT14$
(22) $FE_0 = ST2 \cdot DT15\text{–}21 \cdot NS$
(23) $FT1_0 = ST2 \cdot DT25$
$FT2_0 = ST2 \cdot DT25$
$FT3_0 = ST2 \cdot DT25$
$FT4_0 = ST2 \cdot DT25$
$FT5_0 = ST2 \cdot DT25$
$FT6_0 = ST2 \cdot DT25$
$FT7_0 = ST2 \cdot DT25$
(24) $FT1_1 = ST2 \cdot DT26 \cdot N3$
$FT2_1 = ST2 \cdot DT26 \cdot N2$
$FT3_1 = ST2 \cdot DT26 \cdot N1$
$FT4_1 = ST2 \cdot DT26 \cdot N14$
$FT5_1 = ST2 \cdot DT26 \cdot N13$
$FT6_1 = ST2 \cdot DT26 \cdot N12$
$FT7_1 = ST2 \cdot DT26 \cdot N11$
(25) $FS1_0 = ST2 \cdot DT26 \cdot FE$
(26) $FS2_1 = ST2 \cdot DT26 \cdot FE'$
(27) $FJ_1 = ST2 \cdot DT24 \cdot JU$ (typical)
(28) $FJ_0 = ST2 \cdot DT23$ The miscellaneous flip-flop FQ is set true prior to DT1 of state 2. The logical Equation 12 shows FQ being set true at DT 28 of state 2. In actuality it is DT28 of state 1 but since the computer has exited from state 1 at DT 26 the equation is written at DT 28 of state 2. The important thing to note is that FQ is set true prior to the first digit time of state 2.

The computer in state 2 begins to read the instruction from memory at the beginning of the word time. The operand address is read from memory into the N register during DT's 1 through 14 (13) and is circulated in the N register during DT's 15 through 28 (14). During DT's 18 through 21, the order is read serially from memory into the order register (15). The order register for the purposes of the present description may be considered to be a flip-flop shift register wherein the order is read into FO1 and shifted sequentially into FO2, FO3 and FO4.

FC is used in states 2, 3 and 4 as a carry flip-flop. In the instruction word digit 24 is the jump digit. If digit 24 is true a jump command is indicated. The contents of digit 24 are read into FC such that in the event that a jump command is indicated FC will be set true at DT 24 (16) while if digit 24 of the instruction is 0, FC will be set false at DT 24 (17).

At the same time (DT's 1 through 14) that the operand address is being read from memory serially into N14 of the N register (13), the previous contents of the N register (previously the next instruction address but now the present instruction address (PIA)) are serially output from N1 and augmented by one and serially entered into the C register (19). The contents of the C register are circulated during DT's 15 through 28 (20) and FE is set true at DT 14 (21).

Figure 6:
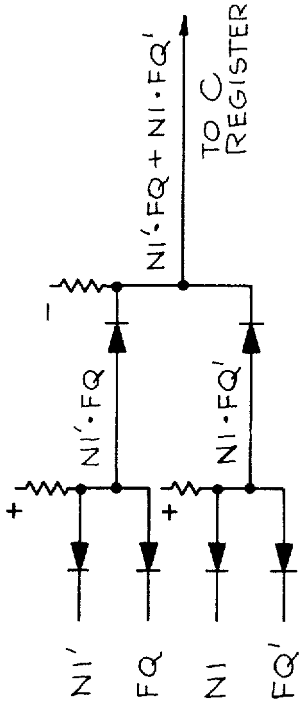
FIGURE 6 is a schematic representation of the exclusive OR gate NQ.

Refer next to FIGURE 6 which is a schematic representation of an exclusive OR, NQ, gate which can be utilized in augmenting by one the contents of the N register which are to be transferred to the C register. The action of the exclusive OR gate, NQ, shown in FIGURE 6 may be expressed by the following logical equation:

$$NQ = N1 \times FQ = N1' \cdot FQ + N1 \cdot FQ'$$

where FQ is a miscellaneous flip-flop which is used for this add one step. FQ is set true at the beginning of the incrementing operation (12) and remains true through the first 0 in the number contained in the N register which, of course, is the number to be increased by one (18). It remains false thereafter.

Refer next to the following chart which will be used to describe the augmenting of the number 0 1 0 111 by 1:

| Digit | 6 | 5 | 4 | 3 | 2 | 1 |
|---|---|---|---|---|---|---|
| FQ | 0 | 0 | 1 | 1 | 1 | 1 |
| N1 (Number) | 0 | 1 | 0 | 1 | 1 | 1 |
| NQ (Number plus 1) | 0 | 1 | 1 | 0 | 0 | 0 |

As shown in the chart, FQ is true in D's (digits) 1 through 4. FQ, however, goes false in D5 since the number to be augmented was false in D4. Next, consider the following logical equation:

$$C_{14}=ST2\cdot DT1\text{–}14\cdot NQ$$

In accordance with the exclusive OR, NQ, it can be seen that NQ will be false whenever FQ and N1 are both true or both false. Conversely, NQ will be true whenever either N1 is true while FQ is false or N1 is false and FQ is true. Thus, referring again to the chart shown in FIGURE 8, NQ is false in DT's 1 through 3 since both FQ and N1 are true. NQ is true, however, in DT 4 since FQ is true while N1 is false. NQ is again true in DT 5 since FQ is false while N1 is true. In this manner through use of the exclusive OR, NQ, the number contained in the N register can be augmented by 1 prior to transfer to the C register.

The C register which now contains the present instruction address plus 1 (PIA+1) is circulated during DT's 15 through 28 (20).

The sector portion of the operand address which appears serially at the output portion (N1) of the N register during DT's 15 through 21 is checked with the sector being read from memory at that time to determine if equality exists, and, if equality is found to exist, the equality flip-flop, FE, is left true at DT 26 while if equality does not exist, FE is set false at DT 26 (22). At each DT 25, the track register is cleared (23) and at DT 26 the track portion of the operand address is entered in parallel to the track register (24). From a consideration of the logical equations grouped under operation (24), it can be seen that the track portion of the operand address at DT 26 is contained in stages N3, N2, N1, N14, N13, N12 and N11 of the N register. The content of N3 is set up in FT1, N2 set up in FT2, N1 set up in FT3, . . . N11 set up in FT7.

If FE is left true at DT 26, FS1 will be set false (25) and the computer will exit to state 4. If, however, FE is false at DT 26, FS2 will be set true (26) and the computer will exit to state 3. Equation 25 is illustrative of a typical command which in this instance is a jump command. At each DT 23 the jump flip-flop, FJ, is set false while if a jump command is encountered FJ is set true at DT 23 (28). FIGURE 9(*c*) illustrates a preferred implementation of logical Equations 12–28. The "ST2" term has been assumed throughout FIGURE 9(*b*).

STATE 3

The logical equations describing the operation of the computer during state 3 are as follows:

(29) $N14=ST3\cdot DT1\text{–}28\cdot N1$
(30) $C14=ST3\cdot DT1\text{–}28\cdot C1$
(31) $FE_1=ST3\cdot DT14$
(32) $FE_0=ST3\cdot DT15\text{–}21\cdot NS$
(33) $FS1_0=DT26\cdot FE\cdot ST3$
(34) $FS2_0=DT26\cdot FE\cdot ST3$ State 3 is merely a searching state during which the N register which contains the operand address is circulated during DT's 1 through 28 (29) and the C register which contains the present instruction address plus one is also circulated (30). After FE is set true at DT 14 (31), the sector portion of the operand address which appears serially at the output portion (N1) of the N register during DT's 15 through 21 is checked with the sector being read from memory at that time to determine if equality exists, and, if equality is found to exist, the equality flip-flop, FE, is left true at DT 26 while if equality does not exist, FE is left false at DT 26 (32). The track portion of the operand address need not be set up in state 3 since it has previously been set up in the track register during state 2 (24).

When FE is left true at DT 26, FS1 will be set false (33) and FS2 will be set false (34) and the computer will exit to state 4. Until the time that equality is found to exist, FE will be false at DT 26, and FS1 will be left true and FS2 will be left true and the computer will remain in state 3 until equality is found to exist between the sector portion of the operand address contained in the N register and the sector being read from memory. FIGURE 9(*d*) illustrates a preferred implementation of logical Equations 29–34.

STATE 4

The logical equations describing the operation of the computer during state 4 are as follows:

(35) $FQ1=ST4\cdot DT28$
(36) $N14=ST4\cdot DT1\text{–}14\cdot CQ\cdot FE$
(37) $FQ_0=ST4\cdot DT1\text{–}14\cdot FE\cdot C1'$
(38) $N14=ST4\cdot DT15\text{–}28\cdot N1$
(39) $N14=ST4\cdot DT1\text{–}28\cdot N1\cdot FE'\cdot FJ$
(40) $N14=ST4\cdot DT1\text{–}14\cdot NQ\cdot FE'\cdot FJ'$
(41) $N14=ST4\cdot DT15\text{–}28\cdot N1$
(42) $FE_1=ST4\cdot DT14$
(43) $FE_0=ST4\cdot DT15\text{–}21\cdot NS$
(44) $FT1_0=ST4\cdot DT25$
$FT2_0=ST4\cdot DT25$
$FT3_0=ST4\cdot DT25$
$FT4_0=ST4\cdot DT25$
$FT5_0=ST4\cdot DT25$
$FT6_0=ST4\cdot DT25$
$FT7_0=ST4\cdot DT25$
(45) $FT1_1=ST4\cdot DT26\cdot N3$
$FT2_1=ST4\cdot DT26\cdot N2$
$FT3_1=ST4\cdot DT26\cdot N1$
$FT4_1=ST4\cdot DT26\cdot N14$
$FT5_1ST4\cdot DT26\cdot N13$
$FT6_1=ST4\cdot DT26\cdot N12$
$FT7_1=ST4\cdot DT26\cdot N11$
(46) $FS1_1=ST4\cdot DT26\cdot FE\cdot FC'$
(47) $FS2_1=ST4\cdot DT26\cdot FC$
(48) $FS2_1=ST4\cdot DT26\cdot FE$
(49) $FC_1=ST4\cdot DT24\cdot STO$
(50) $A28=ST4\cdot DT1\text{–}24\cdot RG$ As previously indicated in the discussion with respect to state 2, if during state 2 sector equality had been found, the computer would have exited directly from state 2 to state 4. The operation of the computer during state 4 is the same regardless of whether the computer went into state 4 either directly from state 2 or went into state 4 from state 3 after searching for equality for a period of time. The operation of the computer during state 4 is dependent on whether a jump or delay command is or is not encountered. When no jump or delay command is encountered, the contents of the C register, which are the present instruction address plus 1 are augmented by 1 during DT's 1 through 14 and transferred to the N register (36). As explained with respect to state 2, the miscellaneous flip-flop FQ is set true prior to the beginning of the add one operation (35). During the first one-half of the computer word FE is used, not as the equality flip-flop but to indicate whether the command is routine or whether or not the command is a jump or delay command. FE being true during the first one-half word indicates a routine command while FE being false indicates a jump or delay command. As will hereinafter be explained, the computer has different memory sectors in the event that a jump or delay command is indicated. Thus FE is used to determine what the next instruction address which is entered into the N register will be.

Figure 7:
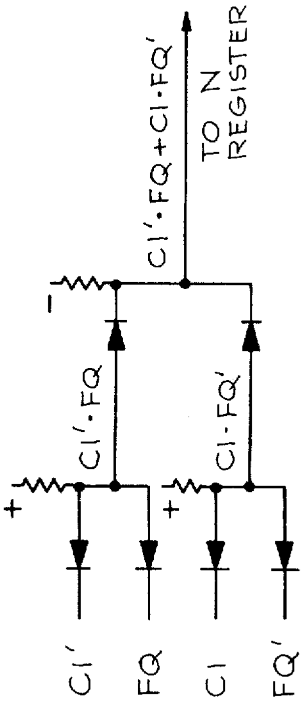
FIGURE 7 is a schematic representation of the exclusive OR gate CQ.

Refer next to FIGURE 7 which is a schematic representation of the exclusive OR, CQ, which is used to increase the contents of the C register by 1 prior to transfer to the N register. The action of the exclusive OR circuit, CQ, is the same as the previously described action of the exclusive OR, NQ, which is used in state 2 to augment the contents of the N register by 1 prior to transfer to the C register. The logical equation setting forth the action of he exclusive OR circuit, CQ, is:

$$CQ=C1\times FQ=C1'\cdot FQ+C1\cdot FQ'$$

Again FQ is set true at the begnining of the add one operation (35) and remains true through the first zero in the number to be augumented (37). The circuit functions as previously stated in the same manner as the exclusive OR circuit, NQ, to implement the contents of the C register in state 4 by 1 prior to entering the N register (36). During DT's 15 through 28, the N register which now contains the present instruction address plus 2 is circulated (38). FE is set true at DT 14 (42). The sector portion of the present instruction address plus 2 (the new next instruction address) contained in the N register is checked for equality with the sector being read from memory during DT's 15 through 21 to determine if equality exists. If equality is found to exist, the equality flip-flop FE remains true while, if equality does not exist, equality flip-flop FE is set false (43). At each DT 25 of state 4, the track register is cleared (44) and at each DT 26 the track address contained in stages N3 through N1 and N14 through N11 of the N register is parallel transferred to the track register (45).

If equality is found to have existed between the sector contained in the N register and the sector read from memory during DT's 15 through 21 and FC is false at DT 26 which indicates that the computer is not to enter the stop mode, FS1 will be set true (46) and the computer will transfer again to state 2. FC must be checked when the computer attempts to exit from state 4 since if the stop mode is indicated the computer must enter directly into state 1. If equality did not exist, as indicated by the equality flip-flop FE being false at DT 26 or if the stop mode is indicated by FC being true at DT 26, FS2 will be set true (48) and the computer will transfer again into state 1 where it will remain until equality is found to exist or until the start button is pressed.

In the event a jump command is to be accomplished, the N register which holds the operand address is circulated during DT's 1 through 28 (39). Equality is checked for between the sector portion of the operand sector address and the sector being read from memory during DT's 15 through 21 and, if equality is found to exist, the flip-flop FE will be left true at DT 26 and, if equality does not exist, the state flip-flop FE will be left false at DT 26 (43). The clearing (44) and transferring (45) of the track portion of the track register are as previously explained.

If the instruction is a jump type, the computer must go to the present instruction address plus 2 if the jump is not accomplished, and to the operand address if it is to be accomplished. The jump flip-flop FJ is set true at DT 26 of state 2 if the jump is to be accomplished and is left false if it is not. Thus, in the event of an accomplished jump command, the next instruction sector is taken not from the next instruction plus 2 but is taken from the operand address.

In the event of a delay command during state 4, the operand address sector which is contained in the N register is increased by 1 through use of the exclusive OR circuit, NQ, during DT's 1 through 14 (40) and circulated in the N register during DT's 15 through 28 (41). The equality flip-flop FE is set true at DT 14 (42). Equality between the sector portion of the operand address plus 1 contained in the N register is checked for during DT's 15 through 21 and, if equality is found to exist, the equality flip-flop, FE, is set true while if equality is found not to exist during DT's 15 through 21, equality flip-flop FE is set false (43). The clearing (44) of the track register at DT 25 of state 4 and the parallel transfer of the track portion to the track register at DT 26 (45) is as heretofore described.

Thus the only difference between a command other than a jump or delay command; a delay command; or a jump command is from whence the sector and track address is taken. The quality determining operation and track clearing set-up operation is the same in all three conditions.

Thus, as is obvious, the computer, while performing an instruction, operates in one of four states. States 1 and 3 are merely waiting or searching states which a computer will not enter into if optimum programming has been achieved, while states 2 and 4 are operating states. FIGURE 9(*e*) illustrates a preferred implementation of logical Equations 35–50. For the sake of simplicity, the "ST4" term has been assumed throughout FIGURE 9(*e*).

Figure 8:
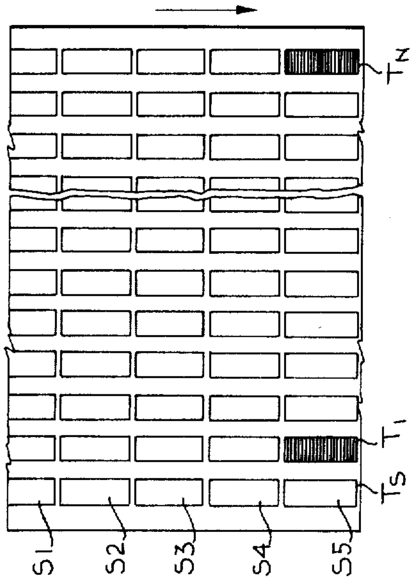
FIGURE 8 is a plan view of a portion of a magnetic memory drum.

Refer next to FIGURE 8. In FIGURE 8 is shown a plan view of a portion of a magnetic drum memory which may be utilized in the present technique. Consider that drum rotation is as depicted by the arrow associated with FIGURE 8. Several parallel tracks are recorded circumferentially around the drum. One track labelled "$T_s$" is the sector track which is used to identify the sector which will next pass under the magnetic heads associated with the other general storage tracks $T_1$ to $T_n$. Thus, when the magnetic head associated with the sector track reads, for instance, sector 1, the next sector appearing under the magnetic heads associated with the general storage tracks $T_1$ through $T_n$ will be sector 1. By "optimum programming" as used in the present description is meant information storage on the memory drum in the following sequence: present instruction address; operand; next instruction address; operand; etc. By this is meant that, for optimum programming to exist, the operand of the present instruction should be stored in a sector immediately following the sector which the present instruction is stored in. Likewise, the next instruction should follow in a sector immediately following the sector in which the previous operand was stored in and the operand of the next instruction should be stored in the sector immediately following the next instruction. As is obvious by "following sector" is meant not necessarily the following sector in the same track but can be the following sector in any track.

Is is quite important that the above sequence be followed whenever possible since, as heretofore described the next instruction address in all operations other than jump or delay is taken from the present instruction address plus two.

Recognizing that the computer cannot always be optimumly programmed, i.e., with the operand in the sector immediately following the instruction and wanting to achieve as high an operational speed as possible, applicant provided the delay command. Refer again for example to FIGURE 8. If the present instructions were contained in Sector 1, the operand would ideally be contained in Sector 2 and the next instruction contained in Sector 3, etc. Consider the case where optimum programming has not been achieved and the operand of the present instruction is contained in, for instance, Sector 5. The computer after locating Sector 5 would then have to make almost a complete revolution before it could read the next instruction address which is contained in Sector 3. On one drum-type memory which applicant is familiar with there are sixty-four sectors in each track, hence, as is obvious, a considerable waste in computer time would result in this case. The delay command is provided to alleviate just such a situation. In the delay command, as previously explained, the next instruction is taken not from the present instruction sector plus 2 as is the normal case but from the operand sector plus one. Therefore, the only time loss results from the unoptimum placing of the operand; once the operand has been located the computer takes the next instruction from the sector immediately following.

In the above described manner I have provided a computer system which can be used in a serial type digital computer to greatly increase its operations. The herein described system enables the performance of most instructions in two word times in a serial machine through utilization of certain parallel techniques which are made possible through utilization of a circulating register which is capable of serial as well as parallel output. A system of simple add one logic is provided and in addition a simple add one technique is employed to augment the present instruction address by one twice to obtain the next instruction address plus two which is the sector from which the next instruction is taken from. Likewise this simple add one technique is employed to increment the present instruction by one to obtain the location of the operand.

The parallel techniques make possible the performance of most instructions in two word times with a minimum number of components and a minimum amount of required memory space which makes the cost of the machine comparable with that of other serial type machines of similar capacity. Thus a system is herein provided which has the cost characteristics of the usual type of serial machines but with much higher speed capabilities.

Also provided is a novel method of routing information in the computer such that the address to be set up in the track register is always taken from the N register. Therefore only the N register need have parallel output capabilities which allow use of an inexpensive non-parallel output register as the C register. However, as previously pointed out, the N register need have as many bits of parallel output capability as there are bits in the track portion of the address.

The embodiments of the invention in which an exclusive property or privilege is claimed are defined as follows:

1. In a data processing system including a cyclic memory having a plurality of storage locations thereon, each identifiable by both a track and sector address and each storing information bits comprising instruction or operand words and wherein each of said instruction words includes an operand address portion specifying, by track and sector address, a memory location storing an operand word;

a first storage register;

a track address storage register;

said first and said track address storage registers adapted to store information bits comprising an instruction address and respectively including a sector and track address specifying a memory location storing a first instruction word;

means serially transferring the information bits comprising said operand address portion of said first instruction word from said specified memory location into said first storage register; and means subsequently transferring the information bits comprising the track address portion of said operand address portion in parallel into said track address register.

2. In a data processing system including a cyclic memory having a plurality of storage locations thereon, each identifiable by both a track and sector address and each storing information bits comprising instruction or operand words and wherein each of said instruction words includes an operand address portion specifying, by track and sector address, a memory location storing an operand word;

a first storage register;

a track address storage register;

said first and said track address storage registers adapted to store information bits comprising an instruction address and respectively including a sector and track address specifying a memory location storing a first instruction word;

means serially transferring the information bits comprising said operand address portion of said first instruction word from said specified memory location into said first storage register;

means searching said memory drum for the sector specified by said sector portion of said operand address portion; and means subsequently transferring the information bits comprising the track address portion of said operand address portion in parallel into said track address register to thereby enable said operand word to be read from the memory location specified by said sector and track address portions of said operand address portion.

3. In a data processing system including a cyclic memory having a plurality of storage locations thereon, each identifiable by both a track and sector address and each storing information bits comprising instruction or operand words and wherein each of said instruction words includes an operand address portion specifying, by track and sector address, a memory location storing an operand word;

a first storage register;

a track address storage register;

said first and said track address storage registers adapted to store information bits comprising an instruction address and respectively including a sector and track address specifying a memory location storing a first instruction word;

a second storage register;

means serially transferring the information bits comprising said operand address portion of said first instruction word from said specified memory location into said first storage register while simultaneously serially transferring the bits of said instruction address into said second storage register; and means subsequently transferring the information bits comprising the track address portion of said operand portion in parallel into said track address register.

4. In a data processing system including a cyclic memory having a plurality of storage locations thereon, each identifiable by both a track and sector address and each storing information bits comprising instruction or operand words and wherein each of said instruction words includes an operand address portion specifying, by track and sector address, a memory location storing an operand word;

a first storage register;

a track address storage register;

said first and said track address storage registers adapted to store information bits comprising an instruction address and respectively including a sector and track address specifying a memory location storing a first instruction word;

a second storage register;

means serially transferring the infomation bits comprising said operand address portion of said first instruction word from said specified memory location into said first storage register while simultaneously incrementing said instruction address by one and serially transferring the bits thereof into said second storage register; and means subsequently transferring the information bits comprising the track address portion of said operand portion in parallel into said track address register.

5. In a data processing system including a cyclic memory having a plurality of storage locations thereon, each identifiable by both a track and sector address and each storing information bits comprising instruction or operand words and wherein each of said instruction words includes an operand address portion specifying, by track and sector address, a memory location storing an operand word and an order portion specifying an operation to be performed;

a first storage register;

a track address storage register;

said first and said track address storage registers adapted to store information bits comprising an instruction address and respectively including a sector and track address specifying a memory location storing a first instruction word;

a second storage register;

means serially transferring the information bits comprising said operand address portion of said first instruction word from said specified memory location into said first storage register while simultaneously incrementing said instruction address by one and serially transferring the bits thereof into said second storage register;

means subsequently transferring the information bits comprising the track address portion of said operand portion in parallel into said track address register to thereby enable said operand word to be read from the memory location specified by said sector and track address portions of said operand address portion;

an order storage register;

means entering said order portion of said instruction word into said order storage register;

means performing said operation specified by said order portion on said operand word; and means subsequently serially transferring the contents of said second storage register to said first storage register while incrementing said contents by one.

References Cited

UNITED STATES PATENTS 2,767,908 10/1956 Thomas ............ 235—157

ROBERT C. BAILEY, *Primary Examiner.*

G. SHAW, *Assistant Examiner.*